(12) United States Patent
Passarotto

(10) Patent No.: US 6,588,474 B2
(45) Date of Patent: Jul. 8, 2003

(54) RIM FOR A BICYCLE WHEEL WITH TUBELESS TIRE

(75) Inventor: Maurizio Passarotto, Vicenza (IT)

(73) Assignee: Campagnolo S.r.l., Vicenza (IT)

(*) Notice: Subject to any disclaimer, the term of this patent is extended or adjusted under 35 U.S.C. 154(b) by 0 days.

(21) Appl. No.: 09/919,903

(22) Filed: Aug. 2, 2001

(65) Prior Publication Data
US 2002/0014293 A1 Feb. 7, 2002

(30) Foreign Application Priority Data
Aug. 3, 2000 (IT) .......................... TO00A0775

(51) Int. Cl.⁷ .............................................. B60C 29/02
(52) U.S. Cl. .................. 152/427; 301/5.24; 301/95.106
(58) Field of Search ........................... 301/5.24, 95.101, 301/95.106; 152/427, 428; 137/223

(56) References Cited
U.S. PATENT DOCUMENTS

| 5,211,782 A | * | 5/1993 | Thelen ........................ 152/427 |
| 5,746,850 A | * | 5/1998 | Luscher et al. ........... 152/339.1 |
| 6,009,895 A | * | 1/2000 | Wass et al. .................. 137/223 |
| 6,119,746 A | * | 9/2000 | Lacombe et al. ............ 152/415 |
| 6,145,937 A | * | 11/2000 | Chen ............................ 301/58 |
| 6,378,953 B2 | * | 4/2002 | Mercat et al. .......... 301/95.106 |

* cited by examiner

Primary Examiner—Russell D. Stormer
(74) Attorney, Agent, or Firm—Volpe and Koenig, P.C.

(57) ABSTRACT

A rim for a bicycle wheel with tubeless tire comprises a radially inner peripheral wall, a radially outer peripheral wall, two circumferential side walls which connect the inner and outer peripheral walls and form two ribs which extend beyond the outer peripheral wall, for anchorage of a tubeless tire. The inner and outer peripheral walls have two holes facing one another, within which an intermediate tubular element is mounted, connected to which is a valve body of a standard type normally used for bicycle wheels provided with inner tubes.

43 Claims, 4 Drawing Sheets

US 6,588,474 B2

RIM FOR A BICYCLE WHEEL WITH TUBELESS TIRE

BACKGROUND OF THE INVENTION

The present invention relates to rims for bicycle wheels with tubeless tires.

In particular, the invention regards a rim for a bicycle wheel with tubeless tire, of the type comprising:
- a radially inner peripheral wall;
- a radially outer peripheral wall;
- two circumferential side walls which connect together said outer wall and said inner wall,
- in which said side walls extend radially outwards beyond said outer peripheral wall, forming two anchoring ribs for a tubeless tire; and
- a valve body rigidly connected to said inner and outer walls for blowing inflation air into the chamber defined between the tire and said outer peripheral wall of the rim.

A rim of the type specified above is, for example, illustrated in FIG. 2 of the European patent application EP-A-0 790 141. In this known solution, the valve body is directly connected to the inner and outer peripheral walls of the rim.

SUMMARY OF THE INVENTION

The purpose of the present invention is to provide a rim of the type specified above which presents a relatively simple and inexpensive structure, enables easy and fast operations of assembly of the tire, guarantees perfect tightness of the chamber defined between the tire and the outer peripheral wall of the rim, and, finally, is able to use, as valve body, a valve body of the standard type normally used for bicycle wheels with tires provided with inner tubes.

With a view to achieving the above purposes, the subject of the present invention is a rim of the type specified at the beginning of the present description, further characterized in that said valve body is a valve body of a standard type used for bicycle wheels with tires provided with inner tubes, and in that said valve body is connected to said inner and outer walls of the rim by means of an intermediate tubular element which is mounted inside two holes facing one another that are made in said inner and outer walls and which presents a portion protruding radially beyond said inner wall in the direction of the axis of the rim, the valve body being secured to said portion.

Preferably, the valve body has an external surface with a threaded portion screwed inside an end threaded portion of the internal surface of the intermediate tubular element.

In one first embodiment, the intermediate tubular element has its radially external end bonded or welded to the outer peripheral wall of the rim. In greater detail, in said embodiment the intermediate tubular element is hermetically bonded or welded to the circumferential edge of the hole in the outer peripheral wall of the rim, as well as to the circumferential edge of the hole in the inner peripheral wall. Furthermore, preferably the radially external end of the intermediate tubular element has a front surface that is substantially flush to the external surface of the outer peripheral wall.

In a second embodiment, the intermediate tubular element is instead connected in a disconnectable way to the rim. In a first example of implementation of said second embodiment, the intermediate tubular element has a radially external end portion mounted in a removable way in a bushing which has its ends fixed, preferably bonded or welded, inside the aforesaid holes facing one another of the outer peripheral wall and inner peripheral wall of the rim. In addition, between the intermediate tubular element and the aforesaid bushing there are set sealing means, for example consisting of one or more O-rings which are mounted inside peripheral grooves of the intermediate tubular element and are pressed into contact with the internal surface of the aforesaid bushing. In the aforesaid first example of implementation of the second embodiment, the intermediate tubular element is screwed inside the bushing and has an annular contrast surface that engages the radially internal end surface of the bushing.

In a second example of implementation of the second embodiment of the invention, the intermediate tubular element has a widened head that rests on the external surface of the outer peripheral wall of the rim and a threaded portion protruding beyond the inner peripheral wall, in the direction of the axis of the rim, on which a nut is screwed, so as to pull the aforesaid head against its resting surface.

In a second example of implementation of the second embodiment, the aforesaid bushing is not present, and the intermediate tubular element is engaged through the aforesaid holes facing one another of the inner and outer peripheral walls of the rim and has a widened end head that rests on the external surface of said outer peripheral wall and a threaded portion that protrudes beyond the inner peripheral wall, in the direction of the axis of the rim, and on which a nut is screwed so as to pull the aforesaid head against its resting surface. Preferably, between said head and said resting surface there are set sealing means, for example consisting of an adhesive, or else an O-ring mounted inside a front annular groove made in the external surface of the outer peripheral wall, along the edge of the respective hole.

Thanks to the above-mentioned characteristics, the invention affords numerous advantages. First of all, the valve body used in the rim according to the invention may be a valve body of a standard type used for rims with tires provided with inner tubes. In the second place, the structure of the rim is simple and inexpensive and enables simple and fast operations both of assembly of the tire and of assembly of the valve body. Finally, in the case of the second embodiment, in which the aforesaid intermediate tubular element is connected in a removable way to the rim, the invention also enables easy and fast conversion of the rim in such a way as to adapt it to a tire provided with inner tube. In this case, in fact, it will be sufficient to remove the intermediate tubular element and mount the inner tube with the corresponding valve body in the traditional way, inserting the valve body through the two holes facing one another that are made in the outer and inner peripheral walls of the rim, as well as through the aforesaid bushing in the examples of embodiment where the latter is present.

BRIEF DESCRIPTION OF THE DRAWINGS

Further characteristics and advantages of the present invention will emerge from the ensuing description, with reference to the attached drawings, provided purely by way of non-limiting example, in which.

DETAILED DESCRIPTION OF THE INVENTION

In the figures, corresponding parts are designated by the same reference numbers.

Figure 1:
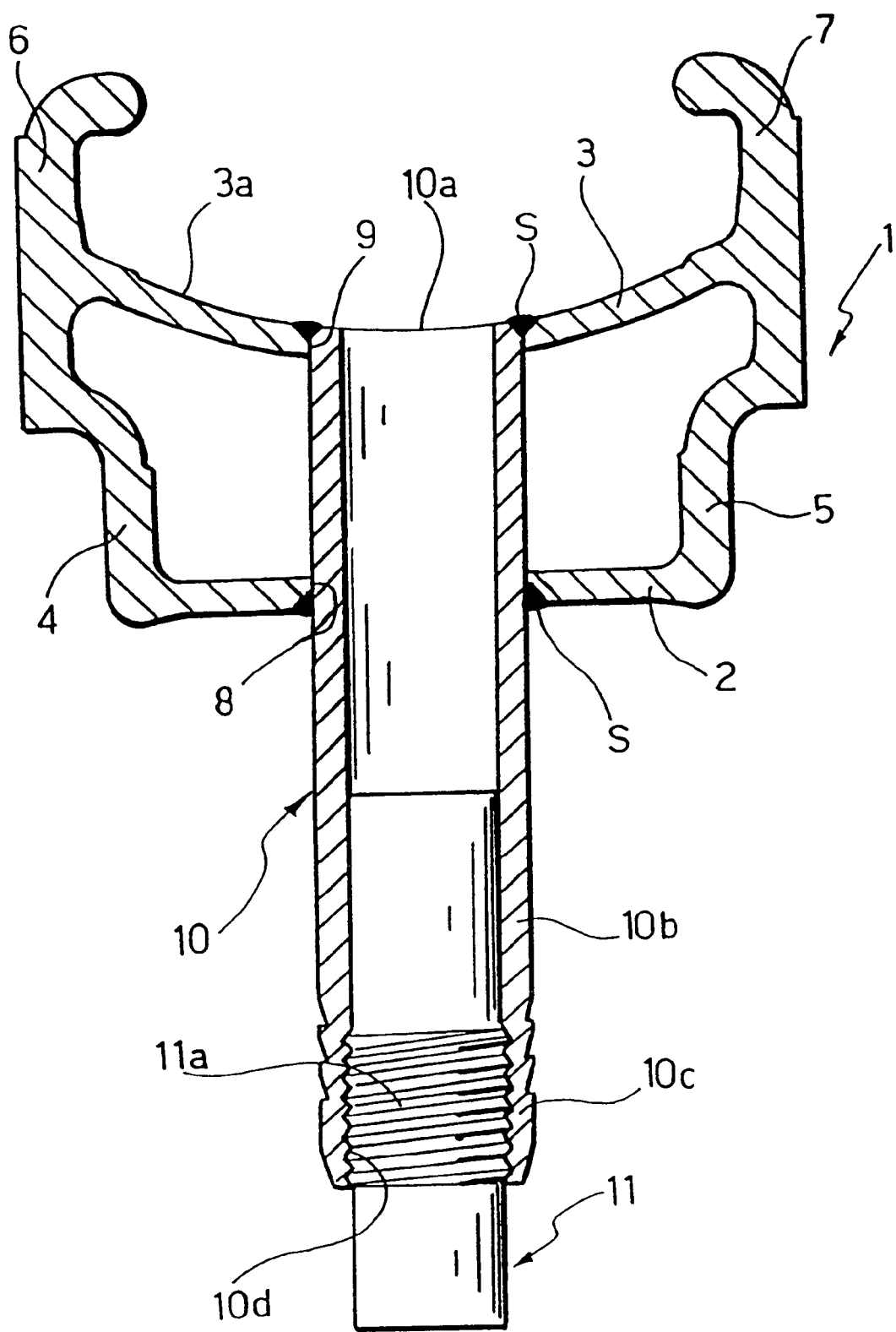
FIG. 1 is a cross-sectional view of the rim according to the invention, in a plane containing the axis of the rim and in the point where the inflating valve is mounted, according to a first embodiment of the invention.

In FIG. 1, the reference number 1 designates, as a whole, a rim for a bicycle wheel, comprising an inner peripheral wall 2, an outer peripheral wall 3, and two circumferential side walls 4, 5, which connect the two walls 2, 3 together and extend radially outwards beyond the wall 3 in such a way as to from two ribs 6, 7 for anchorage of a tubeless tire (not illustrated). In the area where the valve for inflating the tire is to be mounted, the two walls 2, 3 have two holes 8, 9 facing one another, which have a common axis in the radial direction with respect to the axis of the rim, to the edges of which there is fixed, by means of welds or other bonding means S, an intermediate tubular element 10. The tubular element 10 has an end front surface, radially facing outwards and designated by 10a. The surface 10a is shaped and set flush with the external surface 3a of the outer peripheral wall 3 of the rim. In addition, the intermediate tubular element 10 has a portion 10b, which projects beyond the inner peripheral wall 2 in the direction of the axis of the rim (not illustrated) and which terminates with an end portion 10c that has an internal thread 10d. The reference number 11 designates a valve body (illustrated only schematically) of the standard type normally used for bicycle wheels with tires provided with inner tubes. The internal structure of the valve body 11 is not illustrated in so far as it is in itself known. The valve body 11 has an intermediate threaded portion 11a, which is screwed into the threaded portion 11d of the tubular element 10.

Figure 2:
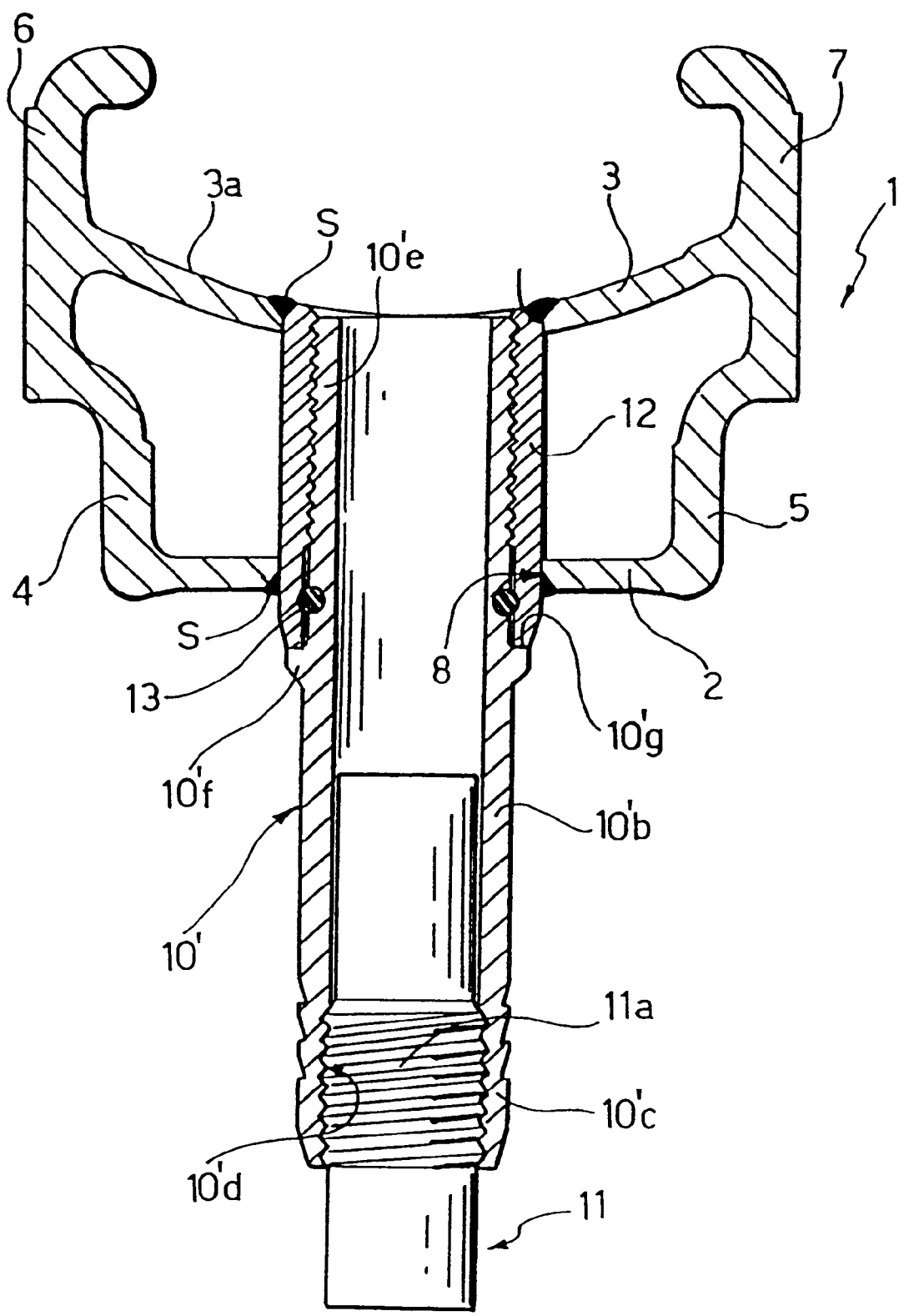
FIG. 2 illustrates a first example of the second embodiment of the invention.

FIG. 2 illustrates a second embodiment, in which the intermediate tubular element 10' is connected in a disconnectable way to the rim 1. In the case of the example of FIG. 2, the intermediate tubular element 10' has radially external end portion 10'e, which is threaded on the outside and which is screwed into the internal threaded surface of a bushing 12, the ends of which are bonded or welded by means of welds or other bonding means 5 within the edges of the holes 8, 9. The end portion 10'e of the intermediate tubular element 10' is moreover provided with an O-ring 13 received in a circumferential groove of said portion 10'e and pressed into contact with the internal surface of the bushing 12 to ensure tightness for preventing air from coming out of the tyre chamber, which is defined between the tyre itself (not shown) and the outer peripheral wall 3 of the rim. Furthermore, the intermediate tubular element 10' has a collar 10'f with an annular contact surface 10'g, which is in contact with the radially internal end surface of the bushing 12.

The embodiment illustrated in FIG. 2 has a slightly more complicated structure that that of the example of FIG. 1, but affords the advantage that it enables easy and fast conversion of the rim into a rim that can be used with a tyre provided with an inner tube. In this case, in fact, it is sufficient to unscrew the intermediate tubular element 10' to remove it, after which the inner tube of the tyre can be mounted in a conventional way, inserting the valve body associated to it through the internal passage of the bushing 12.

Figure 3:
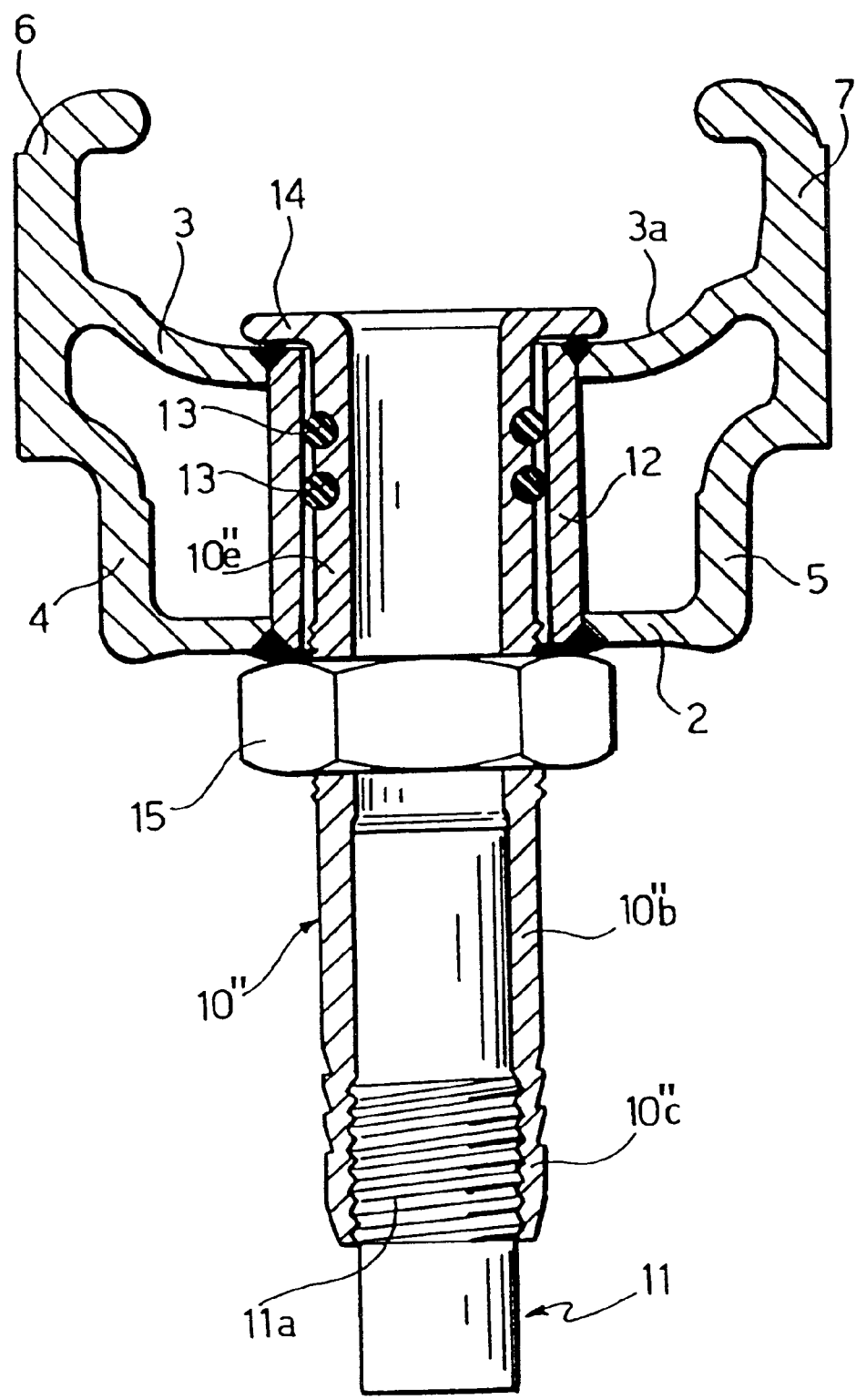
FIGS. 3 and 4 illustrate two further examples of said second embodiment.

FIG. 3 illustrates a variant of FIG. 2, in which the disconnectable connection of the intermediate tubular element 10" inside the bushing 12 is obtained in a different way. In this case, in fact, the intermediate tubular element 10" has, at its radially external end, a widened head 14, which rests on the external surface 3a of the outer peripheral wall 3. In addition, the part 10"b of the intermediate tubular element 10", which projects beyond the inner peripheral wall 2, is threaded to allow screwing of a nut 15, which has the function of securing the intermediate element 10" to the rim, pulling the head 14 against the resting surface 3a. In the case of the example of FIG. 3, moreover, the intermediate tubular element 10" is provided with two O-rings 13 received in respective circumferential grooves of the intermediate tubular element 10". Also the solution of FIG. 3 obviously enables easy adaption of the rim to a tyre provided with inner tube.

Figure 4:
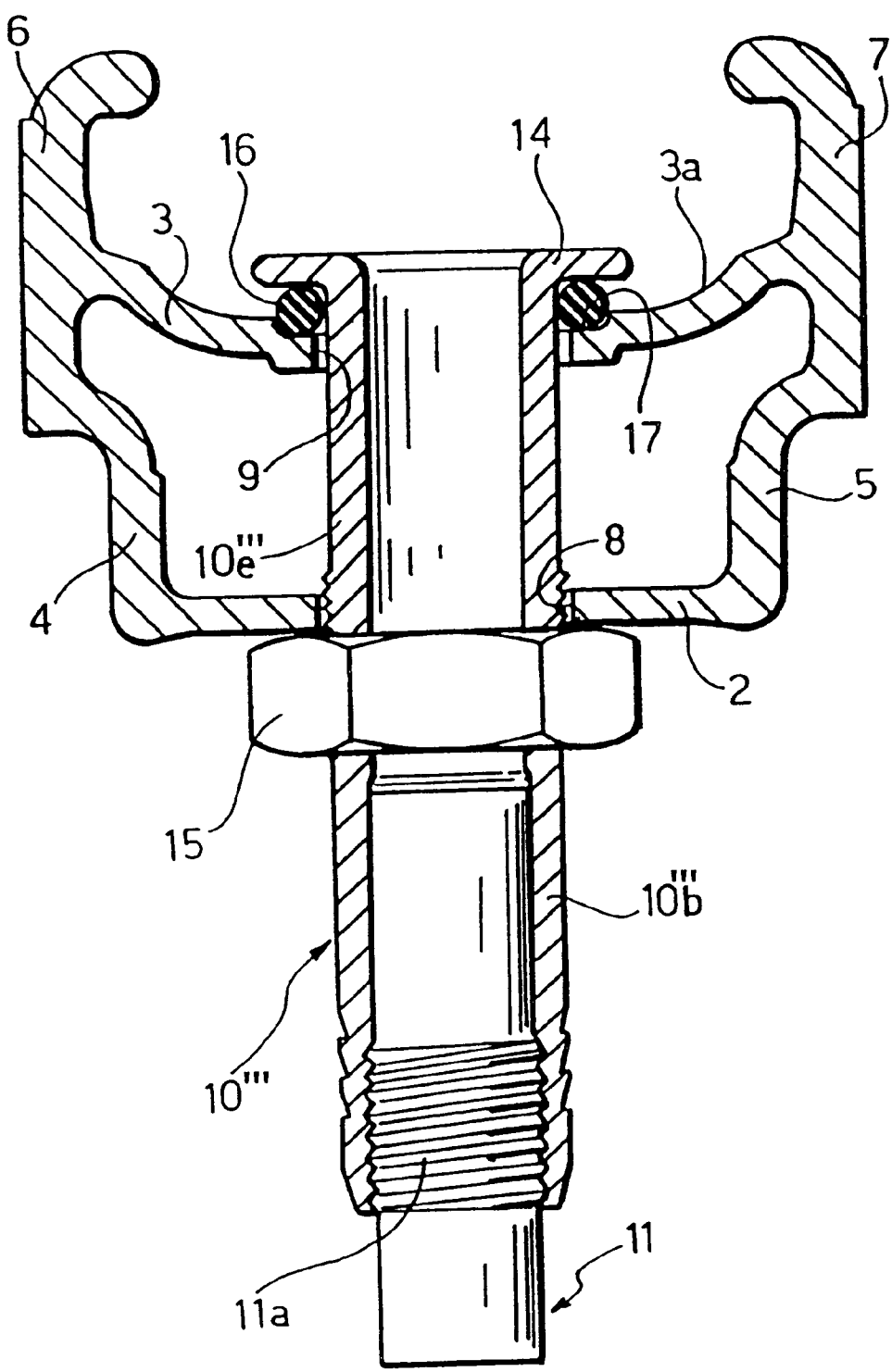

The example of FIG. 4 differs from that of FIG. 3 mainly on account of the elimination of the bushing 12. In this case, tightness is ensured by a single O-ring 16 that is received in a front circumferential groove 17 made in the surface 3a along the edge of the hole 9. The latter solution is preferred in the case of a rim made of a composite material, for instance reinforced with carbon fibre, or in the case of a rim made of light alloy, on account of the absence of welds or other bonding means. Instead of the O-ring 16, any other sealing means may also be used, for example in the form of an adhesive. In addition, the head 14 can be shaped so as to adapt to the profile of the surface 3a in a harmonious way.

From the foregoing description it is evident that the rim according to the invention has a structure that is relatively simple and inexpensive, whilst at the same time guaranteeing perfect air tightness inside the chamber of the tire. It further enables operations of assembly and disassembly to be carried out in a simple and rapid way, and, finally, makes possible, in the case of the aforesaid second embodiment referred to in the examples of FIGS. 2, 3 and 4, an easy and rapid adaptation of the rim to a tire having an inner tube.

Of course, without prejudice to the principle of the invention, the details of construction and the embodiments may vary widely with respect to what is described and illustrated herein purely by way of example, without thereby departing from the scope of the present invention.

What is claimed is:

1. A rim for a bicycle wheel with tubeless tire, comprising:
   a radially inner peripheral wall having a first through hole;
   a radially outer peripheral wall having a second through hole co-axially located with said first through hole;
   two circumferential side walls which connect said inner and outer walls together, said side walls extending radially outwardly beyond said outer peripheral wall and forming two ribs for providing an anchorage for a tubeless tire,
   an intermediate tubular element connecting said first and second through holes, said tubular element having:
      a first end which extends radially inwardly beyond said inner wall;
      valve connection means on said first end for connecting a valve body of the standard type used for bicycle wheels with tires provided with inner tubes;
      non-compression connection means for connecting said tubular element to said inner and outer peripheral walls without radially-compressing said inner and outer peripheral walls; and,
      a valve body rigidly connected to said first end of said intermediate tubular element for inflating the chamber defined between the tire and said outer peripheral wall (3) of the rim;
   wherein said valve body is a valve body of the standard type used for bicycle wheels with tires provided with inner tubes.

2. The rim according to claim 1, wherein the valve body has an external surface with a threaded portion screwed into a threaded portion of the internal surface of the intermediate tubular element.

3. The rim according to claim 2, wherein the threaded portion of the internal surface of the intermediate tubular element, in which the valve body is screwed, is formed at one end of the intermediate tubular element (10).

4. The rim according to claim 1, wherein the intermediate tubular element has its radially external end bonded or welded to the outer peripheral wall of the rim.

5. The rim according to claim 4, wherein the aforesaid radially external end of said intermediate tubular element is hermetically bonded or welded to the circumferential edge of the respective hole in the outer peripheral wall of the rim.

6. The rim according to claim 5, wherein said intermediate tubular element is also bonded or welded to the inner peripheral wall of the rim.

7. The rim according to claim 4, wherein the radially external end of said intermediate tubular element has a front surface that is substantially flush with the external surface of the outer peripheral wall of the rim.

8. The rim according to claim 1, wherein the intermediate tubular element is connected in a disconnectable way to the rim.

9. The rim according to claim 8, including a bushing having ends fixed within said facing holes of the outer peripheral wall and of the inner peripheral wall, wherein the intermediate tubular element has a radially external end portion mounted in a removable way in said bushing.

10. The rim according to claim 9, wherein said bushing has its radially external end portion that is substantially flush with the external surface of the outer peripheral wall of the rim.

11. The rim according to claim 9, wherein said bushing is bonded or welded to the circumferential edges of said facing holes.

12. The rim according to claim 9, wherein between said intermediate tubular element and said bushing are set sealing means.

13. The rim according to claim 12, wherein the sealing means comprise one or more O-rings.

14. The rim according to claim 13, wherein the O-ring or rings are mounted in peripheral grooves of the intermediate tubular element and are pressed into contact with the internal surface of said bushing.

15. The rim according to claim 9, wherein said intermediate tubular element is screwed into said bushing.

16. The rim according to claim 15, wherein said intermediate tubular element has an annular contrast surface designed to engage the radially internal end surface of said bushing.

17. The rim according claim 9, wherein said intermediate tubular element has a widened head that rests on the external surface of the outer peripheral wall of the rim and a threaded portion protruding beyond the inner peripheral wall in the direction of the axis of the rim, on which a nut is screwed, so as to pull the aforesaid head (14) against its resting surface.

18. The rim according to claim 8, wherein said intermediate tubular element is engaged directly through said holes facing one another and has an widened end head that rests on the external surface of said outer peripheral wall and a threaded portion that protrudes beyond the inner peripheral wall, in the direction of the axis of the rim, and on which a nut is screwed so as to pull the aforesaid head against its resting surface.

19. The rim according to claim 18, wherein between said head and its resting surface are set sealing means.

20. The rim according to claim 19, wherein said sealing means comprise an O-ring mounted inside a front annular groove made in the external surface of the outer peripheral wall of the rim, along the edge of the respective hole.

21. A rim for a bicycle wheel with tubeless tire, comprising:

a radially inner peripheral wall;

a radially outer peripheral wall;

two circumferential side walls which connect said inner and outer walls together and extend radially beyond said outer peripheral wall and form two ribs for providing an anchorage for a tubeless tire;

a valve body rigidly connected to said inner and outer walls for inflating the chamber defined between the tire and said outer peripheral wall (3) of the rim, said valve body being a valve body of the standard type used for bicycle wheels with tires provided with inner tubes; and, an intermediate tubular element connecting said valve body to said inner and outer walls of the rim, said tubular element being mounted inside two holes facing one another of said inner and outer walls and having a portion that projects radially beyond said inner wall in the direction of the axis of the rim, said valve body being secured to said portion, wherein said intermediate tubular element is connected in a disconnectable way to the rim;

wherein the intermediate tubular element has a radially external end portion mounted in a removable way in a bushing, which has its ends fixed within said facing holes of the outer peripheral wall and of the inner peripheral wall of the rim; and, wherein said bushing has its radially external end portion that is substantially flush with the external surface of the outer peripheral wall of the rim.

22. The rim recited in claim 21, wherein said bushing is bonded or welded to the circumferential edges of said holes.

23. The rim recited in claim 21, wherein sealing means are positioned between said intermediate tubular element and said bushing.

24. The rim recited in claim 23, wherein said sealing means comprises an O-ring mounted in peripheral grooves in said intermediate tubular element and pressed into contact with the internal surface of said bushing.

25. The rim recited in claim 21, wherein said intermediate tubular element is screwed into said bushing, and said intermediate tubular element has an annular contact surface designed to engage the radially internal end surface of said bushing.

26. A rim for a bicycle wheel with tubeless tire, comprising:

a radially inner peripheral wall;

a radially outer peripheral wall;

two circumferential side walls which connect said inner and outer walls together and extend radially beyond said outer peripheral wall and form two ribs for providing an anchorage for a tubeless tire;

a valve body rigidly connected to said inner and outer walls for inflating the chamber defined between the tire and said outer peripheral wall (3) of the rim, said valve body being a valve body of the standard type used for bicycle wheels with tires provided with inner tubes; and, an intermediate tubular element connecting said valve body to said inner and outer walls of the rim, said tubular element being mounted inside two holes facing one another of said inner and outer walls and having a portion that projects radially beyond said inner wall in the direction of the axis of the rim, said valve body being secured to said portion, wherein said intermediate tubular element is connected in a disconnectable way to the rim;

wherein the intermediate tubular element has a radially external end portion mounted in a removable way in a bushing, which has its ends fixed within said facing holes of the outer peripheral wall and of the inner peripheral wall of the rim; and, wherein said bushing is bonded or welded to the circumferential edges of said facing holes.

27. The rim recited in claim 26, wherein sealing means are positioned between said intermediate tubular element and said bushing.

28. The rim recited in claim 27, wherein said sealing means comprises an O-ring mounted in peripheral grooves in said intermediate tubular element and pressed into contact with the internal surface of said bushing.

29. The rim recited in claim 26, wherein said intermediate tubular element is screwed into said bushing, and said intermediate tubular element has an annular contact surface designed to engage the radially internal end surface of said bushing.

30. A rim for a bicycle wheel with tubeless tire, comprising:

a radially inner peripheral wall;

a radially outer peripheral wall;

two circumferential side walls which connect said inner and outer walls together and extend radially beyond said outer peripheral wall and form two ribs for providing an anchorage for a tubeless tire;

a valve body rigidly connected to said inner and outer walls for inflating the chamber defined between the tire and said outer peripheral wall (3) of the rim, said valve body being a valve body of the standard type used for bicycle wheels with tires provided with inner tubes; and, an intermediate tubular element connecting said valve body to said inner and outer walls of the rim, said tubular element being mounted inside two holes facing one another of said inner and outer walls and having a portion that projects radially beyond said inner wall in the direction of the axis of the rim, said valve body being secured to said portion;

wherein said intermediate tubular element is connected in a disconnectable way to the rim;

wherein the intermediate tubular element has a radially external end portion mounted in a removable way in a bushing, which has its ends fixed within said facing holes of the outer peripheral wall and of the inner peripheral wall of the rim;

wherein sealing means are positioned between said intermediate tubular element and said bushing;

wherein the sealing means comprises one or more o-rings;

wherein the o-ring or rings are mounted in peripheral grooves of the intermediate tubular element and are pressed into contact with the internal surface of said bushing.

31. The rim recited in claim 26, wherein said intermediate tubular element is screwed into said bushing, and said intermediate tubular element has an annular contact surface designed to engage the radially internal end surface of said bushing.

32. A rim for a bicycle wheel with tubeless tire, comprising:

a radially inner peripheral wall;

a radially outer peripheral wall;

two circumferential side walls which connect said inner and outer walls together and extend radially beyond said outer peripheral wall and form two ribs for providing an anchorage for a tubeless tire;

a valve body rigidly connected to said inner and outer walls for inflating the chamber defined between the tire and said outer peripheral wall (3) of the rim, said valve body being a valve body of the standard type used for bicycle wheels with tires provided with inner tubes; and, an intermediate tubular element connecting said valve body to said inner and outer walls of the rim, said tubular element being mounted inside two holes facing one another of said inner and outer walls and having a portion that projects radially beyond said inner wall in the direction of the axis of the rim, said valve body being secured to said portion, wherein said intermediate tubular element is connected in a disconnectable way to the rim;

wherein the intermediate tubular element has a radially external end portion mounted in a removable way in a bushing, which has its ends fixed within said facing holes of the outer peripheral wall and of the inner peripheral wall of the rim;

wherein said intermediate tubular element is screwed into said bushing; and, wherein said intermediate tubular element has an annular contact surface designed to engage the radially internal end surface of said bushing.

33. A rim for a bicycle wheel with tubeless tire, comprising:

a radially inner peripheral wall having a first through hole;

a radially outer peripheral wall having a second through hole co-axially spaced with said first through hole;

two circumferential side walls which connect said inner and outer walls together, said side walls extending radially outwardly beyond said outer peripheral wall and forming two ribs for providing an anchorage for a tubeless tire;

an intermediate tubular element connecting said first and second through holes, said tubular element having:
a first end which extends radially inwardly beyond said inner wall;
a cylindrical outer surface with a maximum outer diameter less than the diameter of both of said through holes;
valve connection means on said first end for connecting a valve body of the standard type used for bicycle wheels with tires provided with inner tubes;
tubular element connection means for connecting said tubular element to said inner and outer peripheral walls; and
a valve body rigidly connected to said first end of said intermediate tubular element for inflating the chamber defined between the tire and said outer peripheral wall (3) of the rim, said valve body comprising a standard valve type used for bicycle wheels with tires provided with inner tubes.

34. The rim recited in claim 33, said tubular element connecting means connecting said tubular member to said peripheral walls without radially-compressing said inner or said outer peripheral wall.

35. The rim recited in claim 33, said tubular element connecting means comprising a cylindrical bushing connected to the circumferential edges of both of said through holes.

36. The rim recited in claim 35, wherein the maximum outer diameter of said tubular member is less than the maximum outer diameter of said bushing.

37. The rim recited in claim 35, the inner surface of said bushing and the outer surface of said intermediate tubular element having cooperatively threaded surfaces, said intermediate tubular element including stops which prevent the end of said tubular element from extending radially outwardly beyond the outer peripheral wall when said tubular element is screwed into said bushing.

38. The rim recited in claim 37, said stops locating the end of said tubular element flush with the outer peripheral wall when said tubular element is screwed into said bushing.

39. An inflation valve mounting assembly for modifying a tubeless tire bicycle rim that has inner and outer peripheral walls with coaxially aligned apertures; two circumferential side walls which connect the inner and outer walls together and form ribs for anchoring a tubeless tire, the valve mounting assembly comprising:

an intermediate tubular element having an outer portion that is received within the aligned apertures and an inner portion that defines a thread pattern compatible a thread pattern associated with a valve body of a type used with inner tubes; and means for retaining the tubular element within the apertures and in sealing engagement with at least the outer peripheral wall;

whereby the assembly modifies the tubeless tire bicycle rim so that it will accept a valve body of a type used with inner tubes.

40. The assembly of claim 39 wherein the inner portion that defines a thread pattern compatible a thread pattern associated with a valve body of a type used with inner tubes is formed at an end of the tubular element.

41. The assembly of claim 39 wherein the tubular element is permanently attached to the outer peripheral wall.

42. The assembly of claim 39 wherein the tubular element is permanently attached to the inner and outer peripheral walls.

43. The assembly of claim 39 wherein the tubular element is generally flush with the outer peripheral wall.

* * * * *

UNITED STATES PATENT AND TRADEMARK OFFICE
CERTIFICATE OF CORRECTION

PATENT NO.    : 6,588,474 B2
DATED         : July 8, 2003
INVENTOR(S)   : Maurizio Passarotto It is certified that error appears in the above-identified patent and that said Letters Patent is hereby corrected as shown below:

Column 3,
Line 14, after the word "to" delete "from" and insert therefore -- form --.
Line 34, after the word "portion" delete "11d" and insert therefore -- 10d --.
Line 43, after the word "means" delete "5" and insert therefore -- S --.

Column 10,
Lines 3 and 13, after the word "compatible", insert the word -- with --.

Signed and Sealed this

Seventh Day of October, 2003

JAMES E. ROGAN
*Director of the United States Patent and Trademark Office*